United States Patent [19]
Mantell

[11] Patent Number: 4,569,634
[45] Date of Patent: Feb. 11, 1986

[54] FAILURE SENSING DIAPHRAGM FOR A DIAPHRAGM PUMP

[76] Inventor: Myron E. Mantell, 4 Rudden La., Morris Plains, N.J. 07950

[21] Appl. No.: 655,369

[22] Filed: Sep. 27, 1984

[51] Int. Cl.$^4$ .................. F04B 21/00; F04B 43/06
[52] U.S. Cl. ...................... 417/63; 417/395; 92/5 R; 92/103 F; 340/605
[58] Field of Search ............... 417/63, 395; 92/5 R, 92/103 F; 340/605, 626; 200/61.08, 83 W, 300

[56] References Cited

U.S. PATENT DOCUMENTS

| | | | |
|---|---|---|---|
| 2,323,950 | 7/1943 | Wade | 340/605 X |
| 2,662,478 | 12/1953 | Surre | 417/63 |
| 2,770,799 | 11/1956 | Horn | 92/5 R |
| 3,105,442 | 10/1963 | Howerton | 417/63 |
| 3,131,638 | 5/1964 | Wilson et al. | 92/5 R X |
| 3,176,623 | 4/1965 | Howerton et al. | 417/63 |
| 3,252,155 | 5/1966 | Surtees et al. | 340/605 |
| 3,383,863 | 5/1968 | Berry | 340/605 |
| 3,431,823 | 3/1969 | Orlita | 417/63 |
| 3,606,592 | 9/1971 | Madurski et al. | 92/103 F X |
| 3,789,297 | 1/1974 | Frolich | 340/605 X |
| 3,807,906 | 4/1974 | Breit | 417/63 X |

FOREIGN PATENT DOCUMENTS 1453454 2/1969 Fed. Rep. of Germany ...... 417/395

Primary Examiner—William L. Freeh
Assistant Examiner—Paul F. Neils
Attorney, Agent, or Firm—Sheldon H. Parker

[57] ABSTRACT

In accordance with the present invention, the imminent failure of a diaphragm due to the attack by a corrosive or a solvent or mechanical fatigue is predicted through the use of a diaphragm pump having a housing, a first chamber within the housing, a second chamber within the housing and a diaphragm mounted in the housing between the first chamber and the second chamber. The diaphragm is of a chemically inert, electrically non-conductive material which contains an interconnected, electrically conductive material extending within the diaphragm less than the full radial dimension of the diaphragm. The conductive material is approximately equally spaced from the two opposing surfaces of the diaphragm. The electrically conductive material is advantageously, an electrically conductive graphite and takes the form of a mesh, screen or web of conductive fibers, filaments or strands.

12 Claims, 9 Drawing Figures

FAILURE SENSING DIAPHRAGM FOR A DIAPHRAGM PUMP

BACKGROUND OF THE INVENTION

1. Technical Field

This application relates to a novel failure sensing diaphragm for use in a diaphragm pump.

2. Description of the Prior Art

Diaphragm pumps are widely used the the chemical, petrochemical, process and other industries, as noted for example, in U.S. Pat. No. 3,285,182, which refers to such speicific uses as in reagent feeding in reactor systems, replenishers and activators in photochemical and electrochemical systems.

U.S. Pat. No. 3,666,379, teaches that when handling corrosive fluids, it is desirable to use a diaphragm disk which should be made of a chemically inert polymer such as polytetrafluroethylene (PTFE). The patent indicates that the previous inability to use PTFE can be overcome through the use of the disk of the patent. Attack of the diapragm by corrosives or solvents leads to the failure of the diaphragm.

The attempts to improve the physical design and chemistry of the material of construction of the diaphragm have lead to improvements. However, diaphragms still have a finite life span.

Devices in accordance with the prior art in the past have been known to exhibit certain shortcomings and problems. As noted in U.S. Pat. No. 3,816,034, mechanically or positively actuated diaphragm pumps suffer from the disadvanage that the diapragm due to its positive mechanical connection to a reciprocating drive, is subject to a combination of high shear, bending and tension stresses in the operation of the pumping cycle. Such stresses then lead to shutdowns and replacement of the diaphragm when destruction thereof is imminent or has occurred.

The failure of the diaphragm is normally preceeded by the development of minute cracks, tears or hair line fissures which expand until there is a pathway comletely through the diaphragm.

The problem associated with the replacement of a diaphragm after failure is that failure takes place when the diaphragm stress induced cracks open to the point where there is a hole completely through the diaphragm and consequently, there is a passage for the flow of liquid between the two pump chambers which are normally separated by the diaphragm. Thus, failure can result in heavy losses due to contamination of material streams, exposure of hardware to corrosives, and excessive down time. The fundamental problem is that it is essentially impossible to predict with accuracy the point in time at which the diaphragm will fail. Predictions are thus made on a statistical average basis, which means the some diaphragm will fail before the time period for periodic replacement and some diaphragm will be replaced prematurely, that is, before the major time period of their life span has been expended.

SUMMARY OF THE INVENTION

It has now been found that the problems encountered with the prior art systems can be overcome through the use of a mechanism which is capable of signaling the imminent failure of the diaphragm due to the attack by a corrosive or a solvent or mechanical fatigue.

In accordance with the present invention, the imminent failure of a diaphragm is predicted through the use of a diaphragm pump having a housing, a first chamber within said housing, a second chamber within said housing and a diaphragm mounted in said housing between said first chamber and said second chamber. The diaphragm is of a chemically inert, electrically non-conductive material which contains an interconnected, electrically conductive material extending within the diapragm less than the full radial dimension of the diaphragm. The conductive material is approximately equally spaced from the two opposing surfaces of the diaphragm. The electrically conductive material is advantageously, an electrically conductive graphite and takes the form of a mesh, screen or web of conductive fibers, filaments or strands.

The system of the instant invention provides among its advantages, extreme ease of manufacture, reliability and low cost, through the use of an unusually low number of simple parts.

BRIEF DESCRIPTION OF THE DRAWINGS

The objects and advantages of the invention will become more apparent and more readily understood when the following detailed description of the invention is read in conjunction with the drawings wherein.

DESCRIPTION OF THE INVENTION INCLUDING THE BEST MODE

The imminent failure of a diaphragm is predicted through the use of a diaphragm in which there is incorporated, an electrically conductive material. A crack, fissure, tear or hole which appears at the surface, expands until the electrically conductive material is exposed to the fluid within the pump housing. The electrically conductive material is connected by means of an electrical lead, to a source of an extremely low electrical voltage and the housing of the pump serves as the ground for the electrical circuit. The fluid within the pump completes the circuit, such that when the conductive material within the diaphragm becomes exposed to the pump fluid, the circuit is completed and an alarm is sounded. Since the current and voltage levels are maintained at a very low level, a transducer, as well known in the art, and the design of which does not constitute a part of the present invention, produces the necessary amplification to sound the alarm or activate a shut down mode.

Figure 1:
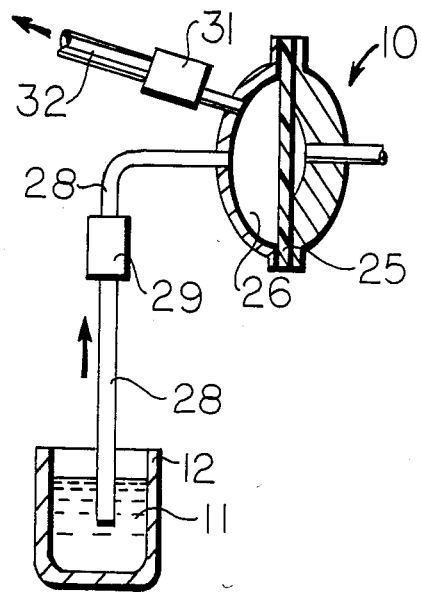
FIG. 1 is a fragmentary cross-sectional side view of a diaphragm pump as well known in the art.

FIG. 1 illustrates one type of diaphragm pump and is not intended to be limiting, but rather the invention applies equally to any diaphragm pump which is being used with an electrically conductive liquid.

As illustrated in FIG. 1, the diaphragm pump 10 serves to pump the liquid 11 from the tank 12. The conduit 28 delivers liquid past the check valve 29 to the receiver. Due to the action on the diaphragm 25 by a fluid or a mechanical device, such as is well known in the art, the liquid is forced past the check valve 31 to the desired end point. The failure of the diaphragm 25 can result in inadequate pumping in the case of a mechanical failure of the membrane. In those instances, however, where the liquid being pumped chemically attacks the material of the diaphragm, the failure more typically takes the form of breaks in the diaphragm which eventually expands from the surface exposed to the liquid towards the other side of the diaphragm, thus delivering the liquid to the region of the pump which is not intended to be exposed to the chemically reactive liquid.

The device of the instant invention functons by sensing the existance of a diaphragm in its initial stage before the failure has progressed to the point where liquid can pass through the diaphragm.

Figure 2:
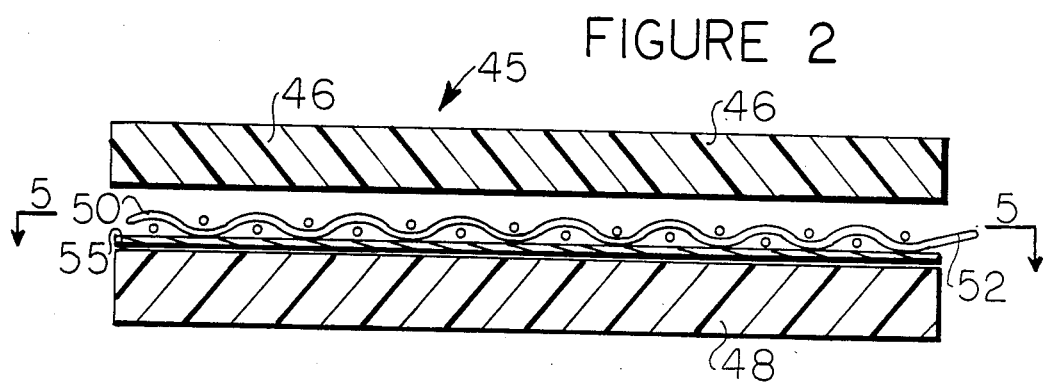
FIG. 2 is a fragmentary exploded side view of a diaphragm assembly in accordance with the present invention.

As illustrated in FIG. 2, in one embodiment, the diaphragm assembly 45 is formed of a first upper diaphragm member 46 and a second lower diaphragm member 48. The conductor element 50 is positioned between the upper diaphragm member 46 and the lower diaphragm member 48. It is common for the diaphragm to inlude a nylon reinforcing sheet 55, between the upper and lower members 46 and 48. The electrically conductive material 50, is positioned on the "wet" side of the nylon reinforcing member. That is to say, it is positioned on the side toward the liquid being pumped. Typically, the two diaphragm members could be one fourth inch membranes fused together by heat to form a half inch thick composit member.

Figure 3:
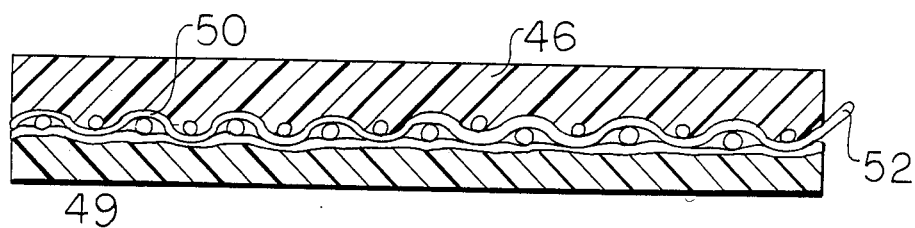
FIG. 3 is a side view of the device of FIG. 2, showing the diaphragm in its assembled form.
Figure 4:
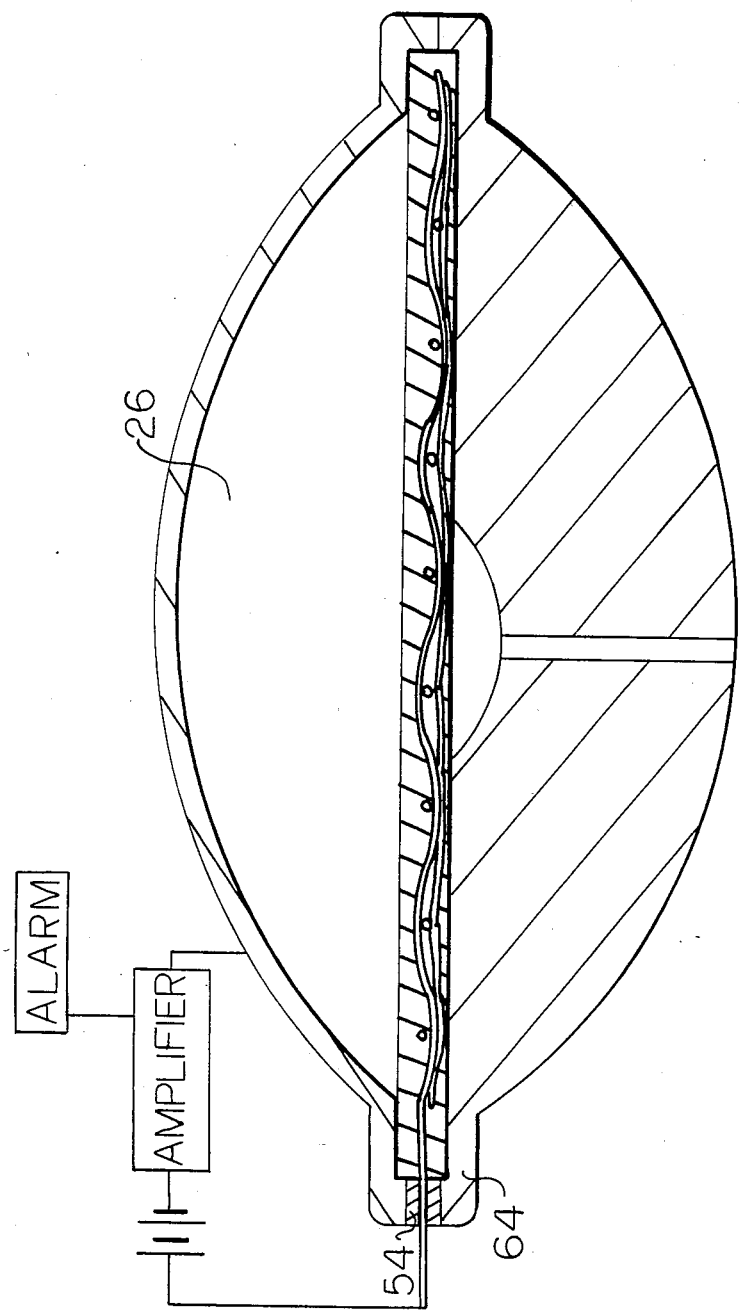
FIG. 4 is a fragmentary crosssectional view of the device of FIG. 3 with the diaphragm shown in a pump housing.
Figure 7:
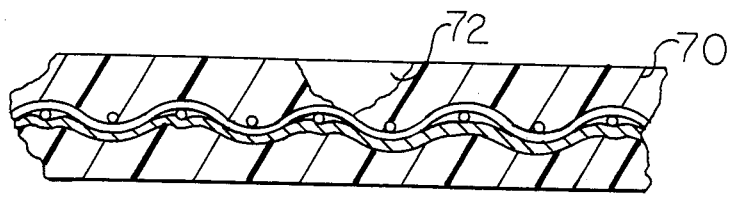
FIG. 7 is a fragmentary side view of the diaphragm of the present invention and illustrating the imminent failure of the diaphragm.

As illustrated in FIG. 3, the electrically conductive material 50, is connected by means of a "pig-tail", that is, an electrical lead (or leads) 52, to the source of an extremely low electrical voltage and the housing of the pump serves as the ground for the electrical circuit. The conductor lead 52 can be shielded from electrical contact with the pump housing element 64. The clamping flange 64 is in electrically conductive contact with the diaphragm pump housing. The fluid 11, within the pump chamber 26 completes the circuit, such that when the conductive material within the diaphragm becomes exposed to the pump fluid, as illustrated in FIG. 7, the circuit is completed and an alarm is sounded or a system shut down is activiated. Since the current and voltage levels are maintained at a very low level, a transducer, as well known in the art, and the design of which does not constitute a part of the present invention, produces the necessary amplification to sound the alarm. Details of the transducer and the electrical circuitry are well known in the art and do not form a part of the instant invention.

In one embodiment, the upper diaphragm member 46 and the lower diaphragm member 48 can be heated to fuse together to form a unitary structure. In another embodiment, the diaphragm can be molded around the conductor element 50 to form a unitary structure. It is possible, but not desirable to have the conductor element 50 between unsealed, separate membranes.

Figure 5:
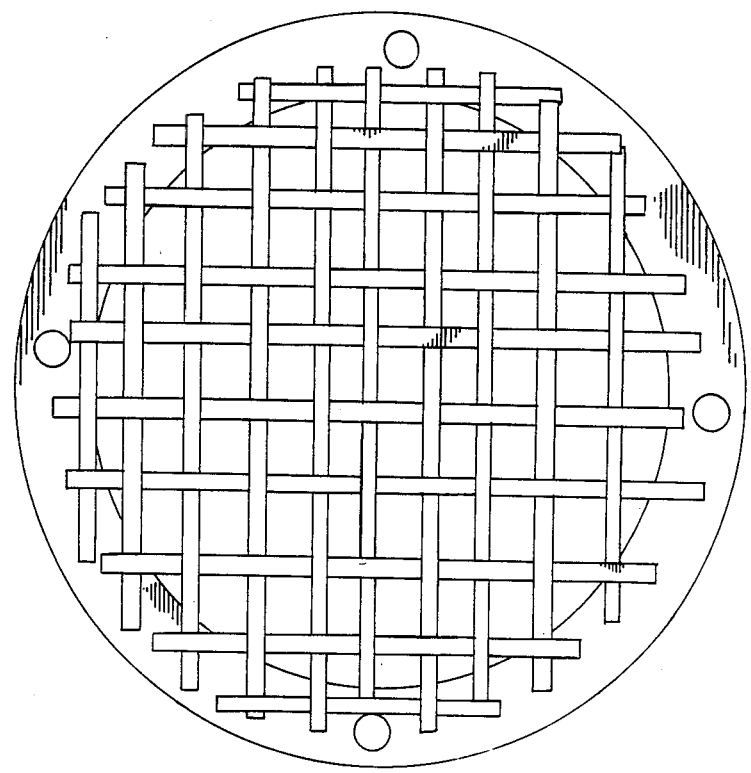
FIG. 5 is a plan view of the diaphragm of the present invention showing the relationship of the conductor member to the diaphragm.
Figure 6:
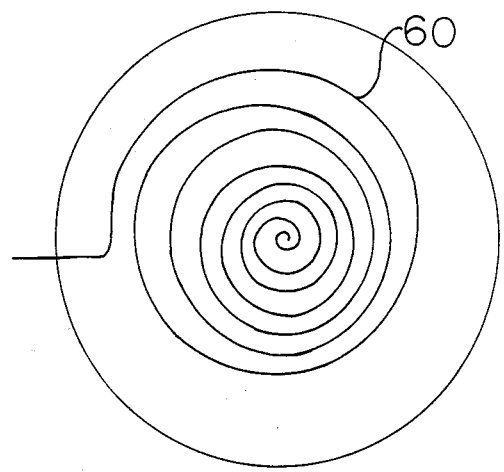
FIG. 6 is a plan view of an alternative device, showing a spiral conductor.

As illustrated in FIG. 5, the electrically conductive material takes the form of a screen or web of conductive fibers, filaments or strands. The use of, for example, a spiral of a conductive material, such as copper, cannot provide the desired results, because the flexing of the diaphragm tends to break the copper spiral and sever part of the copper from the source of electrical power so that an alarm may not be triggered if the diaphragm fails in a region in which exposed copper is down stream of the break. It is evident in the structure of FIG. 6, that any break in the spiral conductor 60 can render the downstream portion of the broken spiral conductor 60 isolated from the electrically conductive upstream portion of the spiral conductor 60, rendering the sensor ineffective unless the diaphragm failure fortuitously occurs proximate to the upstream portion of the spiral conductor 60. The use of a spiral conductor 60 has been found to exhibit the further problem that at the point of the break in the spiral conductor 60 due to the mechanical flexing of the diaphragm, the wire punctures the diaphragm producing a failure of the diaphragm.

Thus, it is critical that the diaphragm be embedded with interconnected fine filaments or strands of conductive wire, fibers or the like, in the form of a screen or mesh. The interconnection assures the continuity of the electrical path from the point or region of the diaphragm failure to the point outside of the pump.

The material of the conductive screen can be a metal, but is preferably fine graphite filaments or fibers. It has been found that the graphite filaments do not adversely affect the flexibiility of the diaphragm. Clearly, the diaphragm itself must be non-conductive, relative to the embedded conductor so that the electrical circuit can not be completed until the diaphragm defect expands to the extent that the conductor is exposed to the fluid being pumped. The exact dimensions of the electrical conductor screen or mesh or the filaments, fibers or strands from which it is made, is not narrowly critical and commercially available materials can be readily employed in the instant invention. Obviously, the dimensions must be such that the electrical conductor is thin relative to the thickness of the diaphragm, so that, as evident from FIG. 7, the conductor is a minor component of the diaphragm, from a size standpoint. In a diaphragm which has an eleven inch radius, a nine inch radius for the conductor produces the desired results. Whereas the comductor must substantially completely span the diaphragm radially, the thickness of the conductor screen is advantageously as small as can be practically attained. It is evident from FIG. 5 that the conductive filaments, strands or the like must be clear of bolt holes or a center hole if required, so that there is no electrical connection. A clearance of at least $\frac{1}{8}$ of an inch is required to provide a minimum safety factor so that there is no inadvertent electrical connection.

Once again, it should be clear that the fluid to be pumped must be sufficiently conductive to provide for a completed circuit when the embedded conductor becomes exposed to the fluid.

Figure 8:
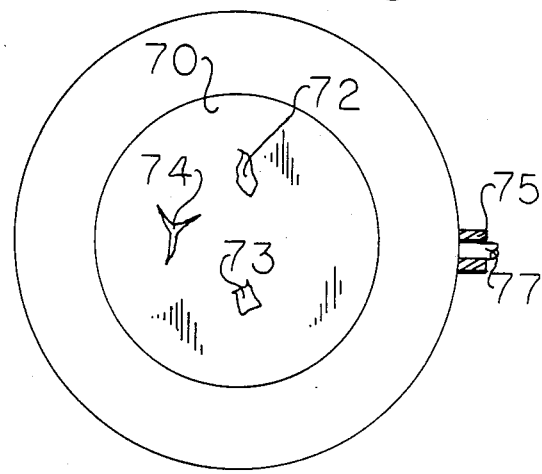
FIG. 8 is a fragmentary plan view of the diaphragm of the present invention and illustrating the imminent failure of the diaphragm.
Figure 9:
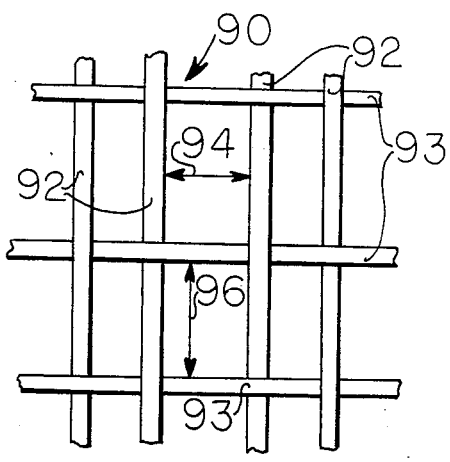
FIG. 9 is a fragmentary plan view of the conductor strands of a diaphragm of the present invention.

As illustrated in FIG. 8, the failures in the diaphragm 70 can take the form of long hair line cracks such as hole 72 and hole 74. The Figure also illustrates the conductor lead 77 which passes through the insulator 75 and makes contact with the electrical circuit (not shown).

While the dimensions of the electrically conductive screen 90, are not narrowly critical, the adjacent strands must be sufficiently close together so that the hole which migrates through the diaphragm cannot pass through the space between the adjacent strands, as indicated for example by the arrow 94 between the parallel strands 92. Similarly, the transverse strands 93 must be sufficiently close as indicated by the arrow 96 to preclude the possibility of the pin hole type of failure from passing between the adjacent parallel strands 92 and transverse strands 93. The desired results can be attained with a 2 to 4 mesh window screen type of structure.

The instant invention would be particularly suited to diaphragm pumps which are handling a corrosive chemical, such as sulfuric acid, since diaphragms are highly sensitive to destruction by the acid, leakage or migration of the acid can be destructive to components of the pump which are not intended to be exposed to the acid, as well as destructive to other hardware with which it can come in contact. Moreover, the acid is highly conductive and consequently works well to complete the electrical circiuit.

What is claimed is:

1. A failure sensing system for use in s diaphragm pump having a housing, a first chamber within said housing, a second chamber within said housing and a diaphragm mounted in said housing between said first chamber and said second chamber, said failure sensing system comprising:
   a chemically inert, electrically non-conductive diaphragm containing a sensing grid in the form of an electrically conductive screen having a thickness substantially less than that of said diaprhagm and a radial dimension less than that of said diaphragm such that it extends proximate the peripherial edge of said diapragm but having dimensions less than the full radial dimension of said diaphragm such that said electrically conductive material is completely enclosed with said diaphragm and is not exposed to the liquid being pumped and is not in direct electrical contact with the pump housing,
   conductor lead means, said conductor lead means extending through the peripherial edge of said diaphragm
   whereby when failure occurs, conductive liquid contacts said screen and completes a circuit to activate failure indicating means.

2. The diaphragm of claim 1, wherein said diaphragm is made by molding said non-conductive chemically inert material around said electrically conductive material.

3. The diaphragm of claim 1, wherein said electrically conductive material is an electrically conductive graphite.

4. The diaphragm of claim 1, wherein said diaphragm is formed of two fused layers of chemically inert, electrically non-conductive material with said electrically conductive material being sandwiched between said two layers.

5. The diaphragm of claim 4, wherein said diaphragm is a composite structure made by positioning said electrically conductive material between said two layers of electrically non-conductive material and heating said two layers until said two layers at least commences to fuse together.

6. The diaphragm of claim 5, wherein said electrically conductive material is an electrically conductive graphite.

7. In a diaphragm pump having a housing, a first chamber within said housing, a second chamber within said housing and a diaphragm mounted in said housing between said first chamber and said second chamber, the improvement comprising:
   a failure sensing system for the diaphragm, said failure sensing system including a sensing screen, an indicator circuit which includes a conductive liquid which is being pumped and alarm means,
   said diaphragm being of a chemically inert, electrically non-conductive material and having a radial dimension, a peripherial edge, and two opposing surfaces spaced apart by the thickness of said diaphragm and having contained therein a sensing screen,
   said sensing screen being an interconnected electrically conductive material extending within the diapragm less than the full radial dimension of said diaphragm except for conductor lead means, which means extends through the peripherial edge of said diaphragm,
whereby when a failure of the diaphragm occurs, conductive liquid contacts said screen and completes a circuit to sound an alarm thereby indicating the failure of said diaphragm.

8. The diaphragm of claim 7, wherein said diaphragm is made by molding said non-conductive chemically inert material around said electrically conductive material thereby forming a unitary structure.

9. The diaphragm of claim 7, wherein said electrically conductive material is an electrically conductive graphite.

10. The diaphragm of claim 7, wherein said diaphragm is formed of two layers of chemically inert, electrically non-conductive material with said electrically conductive material being sandwiched between said two layers and being approximately equally spaced from said two opposing surfaces.

11. The diaphragm of claim 10, wherein said diaphragm is a composite structure made by positioning said electrically conductive material between said two layers of electrically non-conductive material and heating said two layers until said two layers at least commence to fuse together to form a unitary structure.

12. The diaphragm of claim 11, wherein said electrically conductive material is an electrically conductive graphite.

* * * * *